United States Patent
Vigild et al.

(10) Patent No.: US 11,053,841 B2
(45) Date of Patent: Jul. 6, 2021

(54) METHODS AND SYSTEMS FOR A COMPREX CHARGER

(71) Applicant: Ford Global Technologies, LLC, Dearborn, MI (US)

(72) Inventors: Christian Winge Vigild, Aldenhoven (DE); Andreas Kuske, Geulle (NL); Wilbert Hemink, Landgraaf (NL); Bas van den Heuvel, Wijnandsrade (NL)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/890,143

(22) Filed: Jun. 2, 2020

(65) Prior Publication Data

US 2020/0378298 A1    Dec. 3, 2020

(30) Foreign Application Priority Data

Jun. 3, 2019    (DE) .......................... 102019208046.4

(51) Int. Cl.
| | |
|---|---|
| *F02B 37/10* | (2006.01) |
| *F02B 37/12* | (2006.01) |
| *F04D 25/06* | (2006.01) |
| *F02M 26/06* | (2016.01) |
| *F02B 39/00* | (2006.01) |

(52) U.S. Cl.
CPC .............. *F02B 37/10* (2013.01); *F02B 37/12* (2013.01); *F02B 39/005* (2013.01); *F02M 26/06* (2016.02); *F04D 25/06* (2013.01)

(58) Field of Classification Search
CPC ........ F02B 37/10; F02B 37/12; F02B 39/005; F04D 25/06; F02M 26/06; Y02T 10/12
See application file for complete search history.

(56) References Cited

FOREIGN PATENT DOCUMENTS

| | | |
|---|---|---|
| DE | 6823039 T2 | 11/2004 |
| DE | 102005058726 A1 | 7/2006 |
| DE | 102012107649 A1 | 2/2014 |
| DE | 102012223421 A1 | 6/2014 |
| DE | 102011122864 B3 | 4/2017 |
| JP | 2011153542 A * | 8/2011 |

* cited by examiner

*Primary Examiner* — Audrey K Bradley
*Assistant Examiner* — Edward Bushard
(74) *Attorney, Agent, or Firm* — Geoffrey Brumbaugh McCoy Russell LLP (57) ABSTRACT

Methods and systems are provided for a comprex charger. In one example, a comprex charger is integrally arranged with an electric machine and shares a cooling arrangement therewith.

20 Claims, 5 Drawing Sheets

(PRIOR ART)

METHODS AND SYSTEMS FOR A COMPREX CHARGER

CROSS REFERENCE TO RELATED APPLICATIONS

The present application claims priority to German Patent Application No. 102019208046.4 filed on Jun. 3, 2019. The entire contents of the above-listed application is hereby incorporated by reference for all purposes.

FIELD

The present description relates generally to a comprex charger of an internal combustion engine.

BACKGROUND/SUMMARY

In recent years, there has been a trend in development toward charged engines to improve fuel economy and power output. Charging may be a method for increasing power, in which the air used for the combustion process in the engine is compressed, as a result of which a greater air mass may be fed to each cylinder in each working cycle. In this way, the fuel mass and therefore the mean pressure can be increased.

Charging may increase the power of an internal combustion engine while maintaining an unchanged swept volume, or for reducing the swept volume while maintaining the same power. In both cases, charging leads to an increase in volumetric power output and a more expedient power-to-weight ratio. If the swept volume is reduced, it is thus possible to shift the load collective toward higher loads, at which the specific fuel consumption is lower.

Charging consequently assists in the constant efforts in the development of internal combustion engines to minimize fuel consumption, that is to say to improve the efficiency of the internal combustion engine. Some transmission configurations may provide downspeeding, whereby a lower specific fuel consumption is likewise achieved. Downspeeding utilizes the fact that the specific fuel consumption at low engine speeds is generally lower, in particular at relatively high loads.

An exhaust gas turbocharger, in which a compressor and a turbine are arranged on the same shaft, may provide charging. The hot exhaust gas flow is fed to the turbine and expands in the turbine with a release of energy, as a result of which the shaft is set in rotation. The energy released by the exhaust gas flow to the turbine and ultimately to the shaft is used for driving the compressor, which is likewise arranged on the shaft. The compressor conveys and compresses the charge air fed to it, as a result of which the cylinders are charged. A charge air cooler is advantageously provided in the intake system downstream of the compressor, via which charge air cooler the compressed charge air is cooled before it enters the at least one cylinder. The cooler lowers the temperature and thereby increases the density of the charge air, such that the cooler also contributes to improved filling of the cylinders, that is to say to a greater air mass. Compression by cooling takes place.

The advantage of an exhaust gas turbocharger in comparison with a supercharger, which can be driven via an auxiliary drive, consists in that an exhaust gas turbocharger utilizes the exhaust gas energy of the hot exhaust gases, whereas a supercharger draws the energy used for driving it directly or indirectly from the internal combustion engine and thus adversely affects, that is to say reduces, the efficiency, at least for as long as the drive energy does not originate from an energy recovery source.

If the charger is not driven via an electrical machine, that is to say electrically, a mechanical or kinematic connection for power transmission is generally desired between the charger and the internal combustion engine, which also influences the packaging in the engine bay.

Even if the charger is an electrically driven charger, it is desired to place the electrical machine or generator in the engine bay in the immediate vicinity of the charger, which hinders or influences packaging, or to arrange this at a distance from the charger with the interposition of a device for power transmission, for example a traction means drive. In both cases, the weight and installation space demanded are increased.

The advantage of a charger in comparison with an exhaust gas turbocharger consists in that the charger can generate and provide the desired charge pressure at all times, specifically regardless of the operating state of the internal combustion engine. This applies in particular to a charger which is driven electrically via an electrical machine, and is therefore independent of the rotational speed of the crankshaft.

In previous examples, it is specifically the case that difficulties are encountered in achieving an increase in power in all engine speed ranges via exhaust gas turbocharging. A relatively severe torque drop is observed when the engine speed is below a certain level. The torque drop is due to the fact that the charge pressure ratio is dependent on the turbine pressure ratio or the turbine power. If the engine speed is reduced, this leads to a smaller exhaust gas mass flow and therefore to a lower turbine pressure ratio or a lower turbine power. Consequently, towards lower engine speeds, the charge pressure ratio likewise decreases. This equates to a torque drop.

In other previous examples, attempts have been made to improve the torque characteristic of a charged internal combustion engine using various measures.

One such measure, for example, is a reduced size of the turbine cross section and simultaneous provision of an exhaust gas blow-off facility. Such a turbine is also referred to as a waste-gate turbine. If the exhaust gas mass flow exceeds a critical value, a part of the exhaust gas flow is, within the course of the so-called exhaust gas blow-off, conducted via a bypass line past the turbine. This approach has the disadvantage that the charging behavior is inadequate at relatively high rotational speeds or in the presence of relatively high exhaust gas quantities.

The torque characteristic of a charged internal combustion engine may also be advantageously influenced via a plurality of exhaust gas turbochargers connected in series. By connecting two exhaust gas turbochargers in series, of which one exhaust gas turbocharger serves as a high-pressure stage and one exhaust gas turbocharger serves as a low-pressure stage, the engine characteristic map may advantageously be expanded, specifically both in the direction of smaller compressor flows and also in the direction of larger compressor flows.

The downsizing effect is further enhanced by way of multi-stage charging via exhaust gas turbochargers. Furthermore, the response behavior of an internal combustion engine charged in this way is considerably improved in relation to a similar internal combustion engine with single-stage charging, because the relatively small high-pressure stage is less sluggish, and the rotor of a smaller-dimensioned exhaust gas turbocharger can be accelerated more rapidly.

The torque characteristic of a charged internal combustion engine may furthermore be improved via multiple turbochargers arranged in parallel, that is to say via multiple turbines of relatively small turbine cross-section arranged in parallel, wherein turbines are activated successively with increasing exhaust gas flow rate.

Additional issues may arise in internal combustion engines with exhaust gas turbocharging which are equipped with exhaust gas recirculation to recirculate combustion gases from the exhaust side to the inlet side in order to lower nitrogen oxide emissions. In particular, it may be taken into account that high exhaust gas recirculation rates are desired in order to achieve a significant fall in nitrogen oxide emissions.

Issues may arise upstream of the compressor if the internal combustion engine is equipped with an exhaust gas recirculation arrangement in which the exhaust gas is introduced into the intake system upstream of the compressor. Specifically, condensate can form in the free charge air flow when recirculated hot exhaust gas meets and is mixed with cool fresh air. Secondly, condensate can form when recirculated hot exhaust gas or charge air meets the cooler inner wall of the intake system.

The exhaust gas recirculation arrangement may be a high-pressure EGR arrangement, which extracts exhaust gas from the exhaust gas discharge system upstream of the turbine of the exhaust gas turbocharger and introduces said exhaust gas into the intake system, or a low-pressure EGR arrangement, via which exhaust gas which has already flowed through the turbine is recirculated to the inlet side. A low-pressure EGR arrangement comprises a recirculation line which branches off from the exhaust gas discharge system downstream of the turbine and which opens into the intake system upstream of the compressor.

A disadvantage of the high-pressure EGR arrangement in relation to the low-pressure EGR arrangement may include that the exhaust gas stream introduced into the turbine during exhaust gas recirculation is reduced by the recirculated exhaust gas quantity. The entire exhaust gas stream is no longer available at the turbine to generate the charge pressure. In fact, the exhaust gas recirculated in the low-pressure EGR system may first be subjected to exhaust gas aftertreatment, in particular in a particle filter, since the exhaust gas is passed through the compressor.

Another concept of charging an internal combustion engine is so-called comprex charging via a pressure wave charger. The comprex charger has a rotatable cellular wheel, i.e. a cylindrical roller in which a plurality of segment-like channels or cells extend between the end faces of the roller along the rotation axis of the roller. At the end faces of the roller, the cells are formed open in limited predefined regions and are otherwise closed, wherein an exhaust gas inlet and spaced therefrom an exhaust gas outlet are provided on one end face, and a charge air inlet and spaced therefrom a charge air outlet are provided on the other end face.

The inventors have identified the above issues and have come up with a way to at least partially solve them. In one example, a charged internal combustion engine comprises at least one cylinder, an exhaust gas discharge system for the discharge of the exhaust gases, an intake system for the supply of charge air, and at least one comprex charger comprising a cylindrical cellular wheel which is rotatable about a rotation axis, is arranged in a housing and comprises cells which extend between the end faces of the cellular wheel along the rotation axis of the cellular wheel, which is characterized in that the comprex charger is equipped with a liquid cooling system. According to the disclosure, the at least one comprex charger of the internal combustion engine is equipped with a liquid cooling system.

The liquid cooling system may function and be configured as a charge air cooler, via which the compressed charge air is cooled before it enters the cylinders. The liquid cooling system may also function and be configured as an EGR cooler for cooling recirculated exhaust gas or exhaust gas for recirculation. If the comprex charger is a charger driven electrically via an electrical machine, and if the comprex charger and the electrical machine are configured as a structural unit, that is to say as an integrated component, the liquid cooling system can function and be configured as a cooling system of the electrical machine.

By integrating the liquid cooling system into the comprex charger, for example into the housing, the need to additionally provide a separate liquid cooling system in the engine bay is eliminated. Packaging is simplified.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a comprex turbocharger. The comprex turbocharger may be included in an arrangement of an internal combustion engine. The internal combustion engine may be used in a motor vehicle drive unit. Within the context of the present disclosure, the expression "internal combustion engine" encompasses diesel engines and petrol engines, but also hybrid internal combustion engines, that is to say internal combustion engines which are operated with a hybrid combustion process, and hybrid drives which, in addition to the internal combustion engine, comprise at least one further torque source for driving a motor vehicle, for example an electrical machine which is or can be connected in terms of drive to the internal combustion engine and which outputs power instead of or in addition to the internal combustion engine.

In one example, a charged internal combustion engine is provided which is improved with respect to comprex charging via a pressure wave charger, and with which the disadvantages known from the prior art can be overcome. The comprex charger comprises a cylindrical cellular wheel which is rotatable about a rotation axis, is arranged in a housing and comprises cells which extend between the end faces of the cellular wheel along the rotation axis of the cellular wheel, which is characterized in that the comprex charger is equipped with a liquid cooling system.

Figure 1:
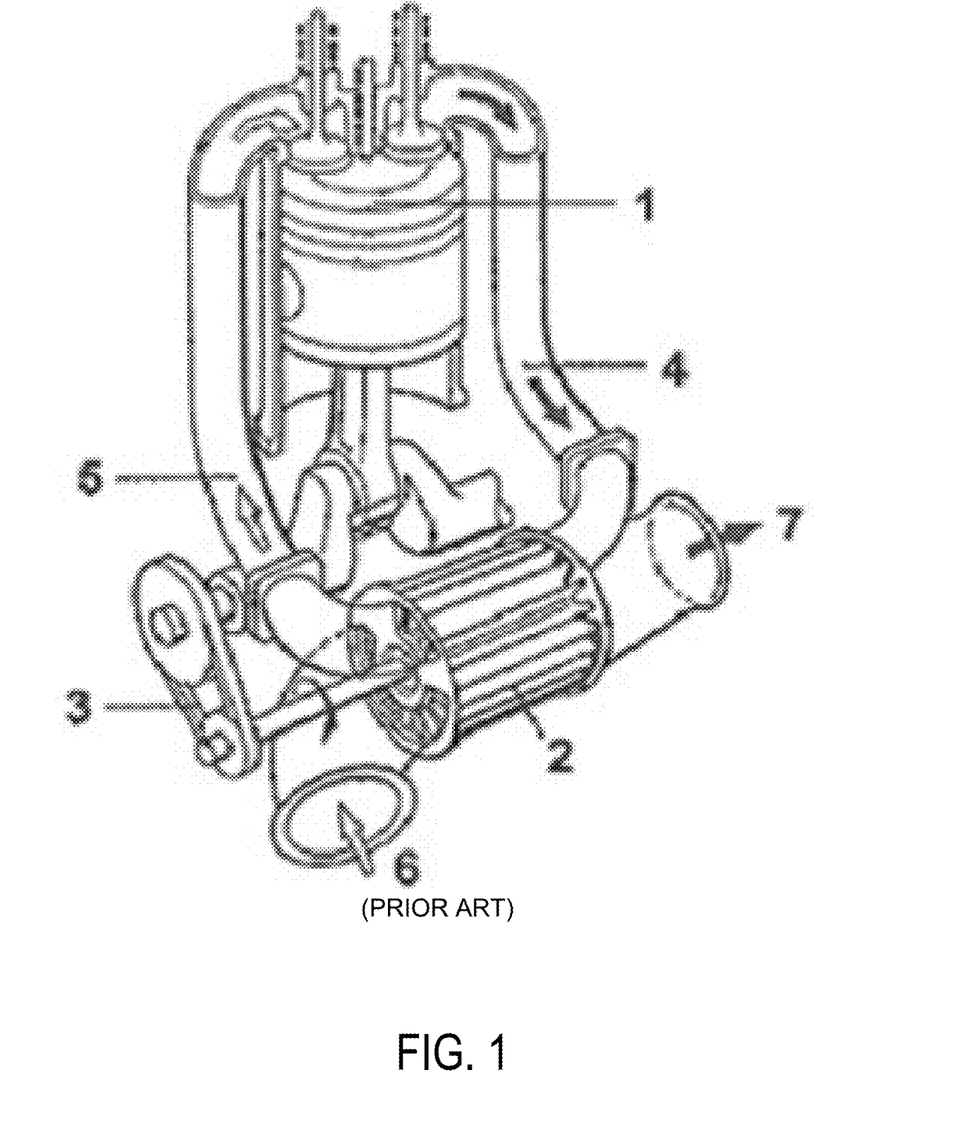
FIG. 1 shows diagrammatically and in a three-dimensional depiction a comprex charger integrated in the intake system and exhaust gas discharge system, together with mechanical drive according to the prior art.
Figure 2:
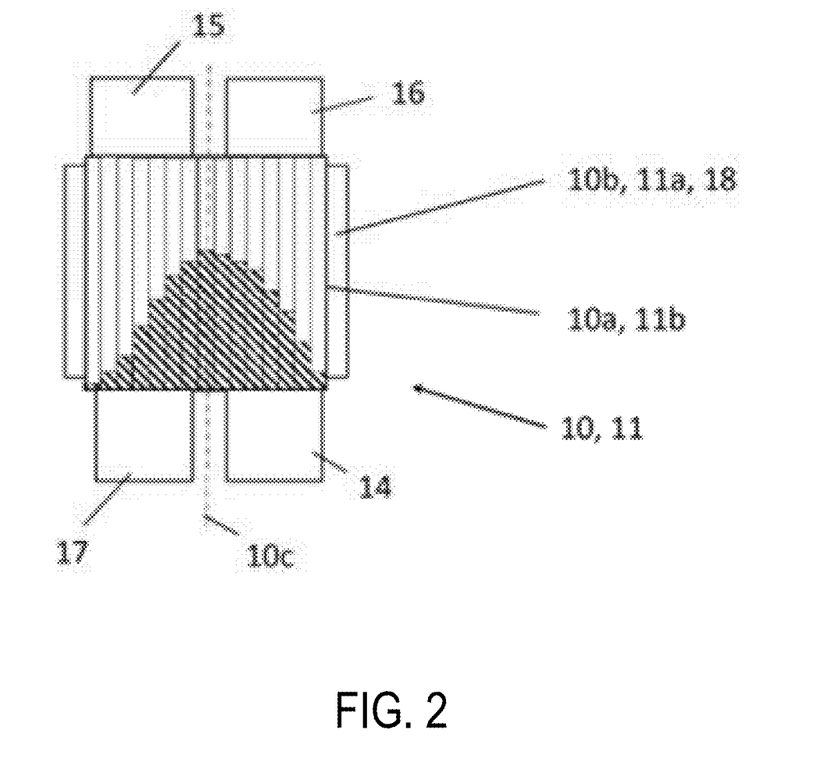
FIG. 2 shows diagrammatically and in longitudinal section, the comprex charger of a first embodiment of the charged internal combustion engine.
Figure 4:
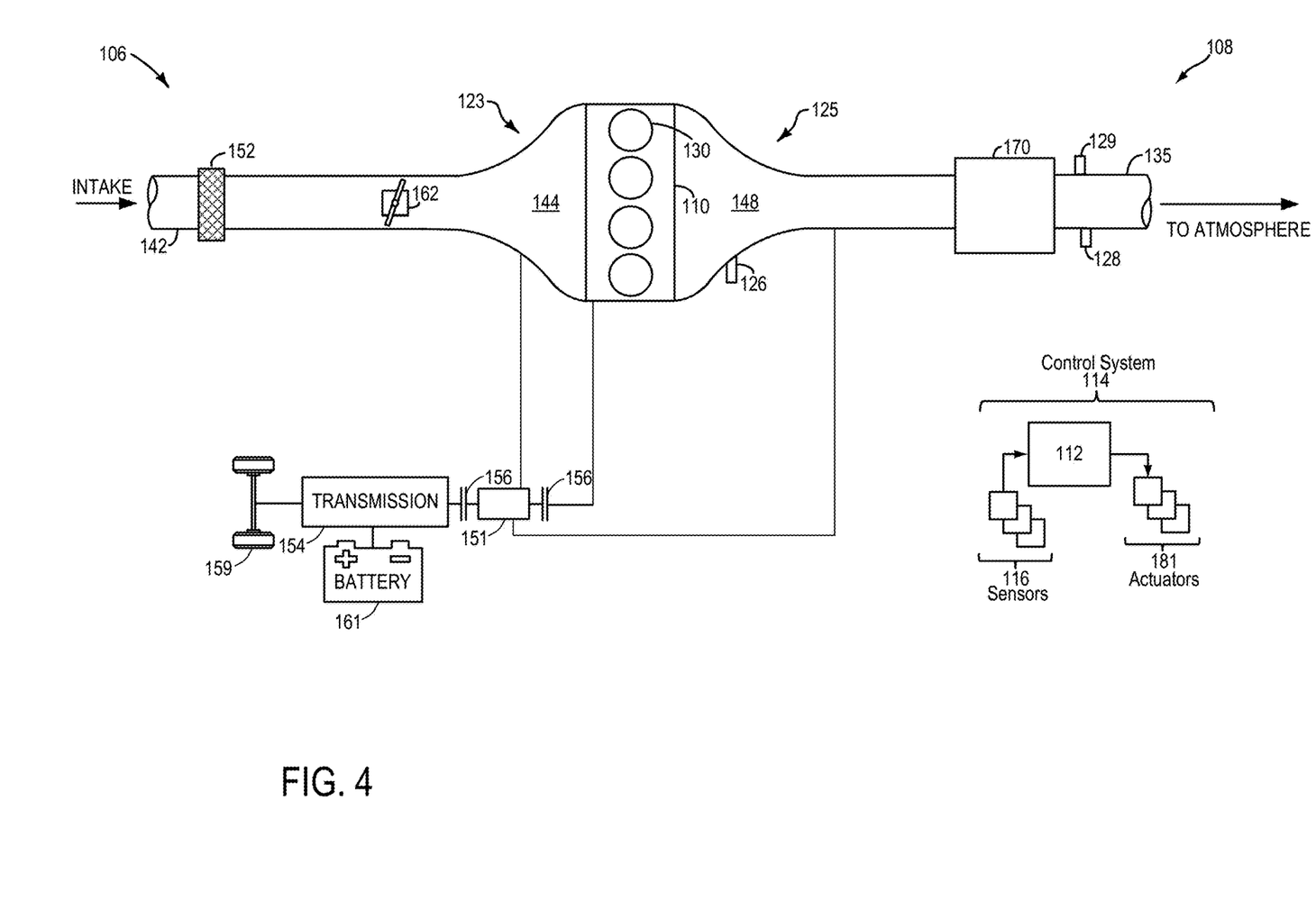
FIG. 4 shows hybrid vehicle arrangement.
Figure 5:
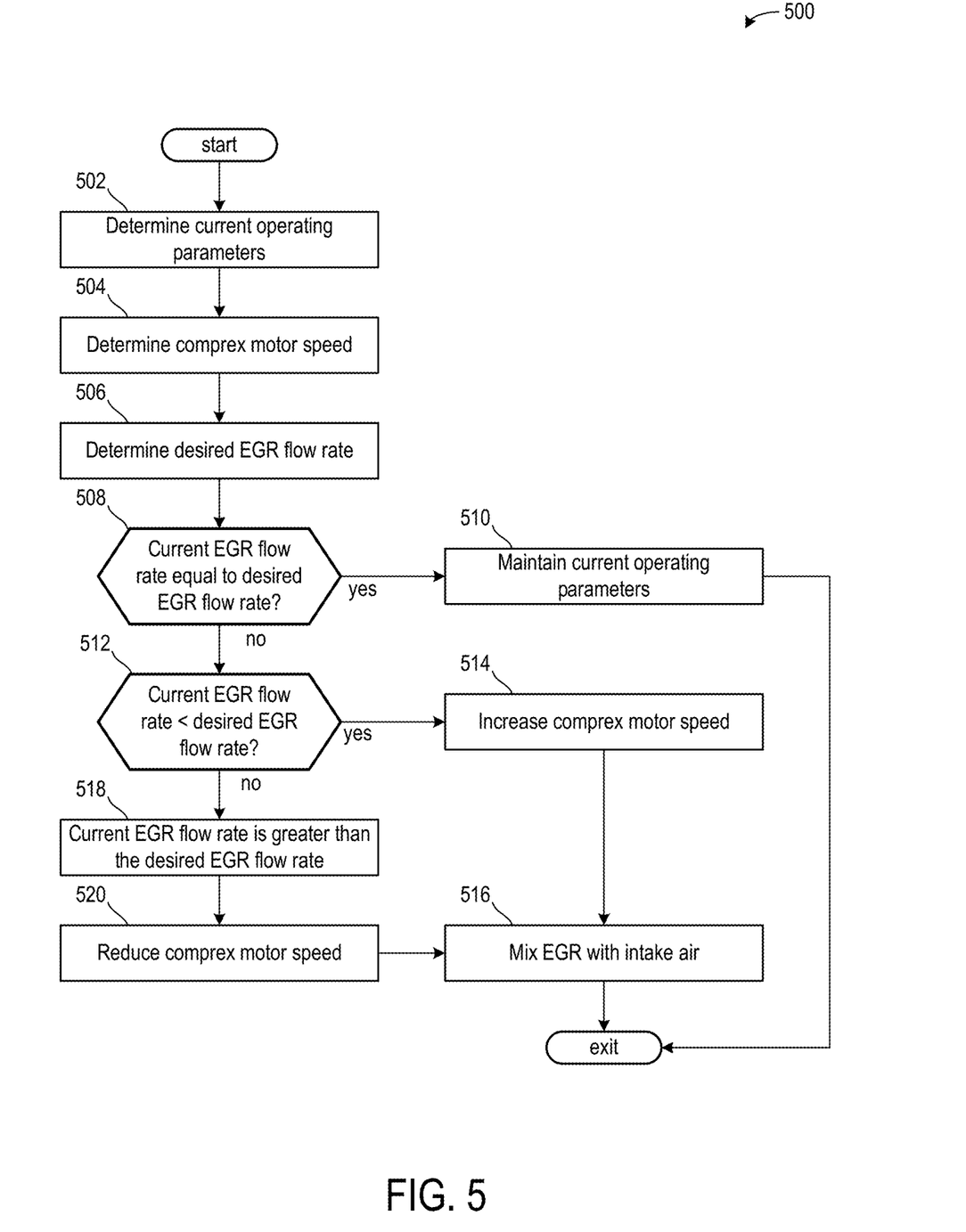
FIG. 5 shows a method for adjusting a rotational speed of the comprex charger based on a plurality of conditions including a desired EGR flow rate.

According to the disclosure, the at least one comprex charger of the internal combustion engine is equipped with a liquid cooling system, as illustrated in FIGS. 2 and 3. FIG. 1 illustrates a prior art example of a comprex charger. FIG. 4 illustrates a hybrid vehicle comprising an electric motor integrally formed with a comprex charger. FIG. 5 illustrates a method for adjusting a speed of the comprex charger in response to a desired EGR flow rate.

The liquid cooling system may function and be configured as a charge air cooler, via which the compressed charge air is cooled before it enters the cylinders. The liquid cooling system may also function and be configured as an EGR cooler for cooling recirculated exhaust gas or exhaust gas for recirculation. If the comprex charger is a charger driven electrically via an electrical machine, and if the comprex charger and the electrical machine are configured as a structural unit, that is to say as an integrated component, the liquid cooling system can function and be configured as a cooling system of the electrical machine.

By integrating the liquid cooling system into the comprex charger, for example into the housing, the need to additionally provide a separate liquid cooling system in the engine bay is eliminated. Packaging is simplified.

In some examples of the charged internal combustion engine, additionally or alternatively, the cells are formed open at the end faces of the cellular wheel.

Embodiments of the charged internal combustion engine may further comprise where the housing, an exhaust gas inlet, and spaced therefrom an exhaust gas outlet are provided on one end face, and a charge air inlet and spaced therefrom a charge air outlet are provided on the other end face, so that at the end faces of the cellular wheel, the cells are open in limited predefined regions of the housing and are otherwise closed.

Embodiments of the charged internal combustion engine may comprise where the comprex charger is a charger driven electrically via an electrical machine, wherein the electrical machine comprises a stator and a rotor.

In the present case, the at least one comprex charger of the internal combustion engine is driven electrically. This drive concept has numerous advantages in relation to the mechanical drive from the prior art of FIG. 1.

The electrical drive is independent of the rotational speed of the crankshaft, for which reason it is possible via an electrical machine for the comprex charger to be driven in accordance with demand at an increased operating range relative to the prior art of FIG. 1. There is no dependency on the present operating state of the internal combustion engine, in particular on the engine speed.

In this context, embodiments of the charged internal combustion engine may comprise where the comprex charger and the electrical machine constitute or are separate components.

Here, in turn, embodiments of the charged internal combustion engine may comprise where the comprex charger and the electrical machine are connected together by means of a traction means drive.

However, in some embodiments of the charged internal combustion engine may comprise where the comprex charger and the electrical machine are formed as an integral component, wherein the cellular wheel forms the rotor and the housing forms the stator.

In one example of the present disclosure, the electrical machine is configured to drive the charger integrated in the charger. In other words, the comprex charger and the electrical machine are configured as a structural unit or integrated component. The electrical machine comprises a stator and a rotor, wherein the cellular wheel of the comprex charger forms the rotor and the housing of the comprex charger forms the stator. Such an example is enhanced relative to the prior art. By integrating the electrical machine in the comprex charger, it is no longer needed to position or accommodate a separate electrical machine additionally in the engine bay, in particular in the direct vicinity of the charger. This perceptibly facilitates the packaging of the entire drive unit in the engine bay. As well as the installation space demand, the weight and number of components are also reduced. A device for power transmission, for example a traction means drive, is in principle no longer needed and is obsolete.

If the comprex charger and the electrical machine are configured as a structural unit, i.e. an integrated component, embodiments of the charged internal combustion engine may comprise where the housing serving as the stator is equipped with a permanent magnet for generating a magnetic field.

In the case of a direct-current motor, the static stator may be in the form of a permanent magnet. It is however then desired for the rotor to comprise an energizable coil for generating a magnetic field.

In this context therefore, embodiments of the charged internal combustion engine are advantageous in which the cellular wheel serving as the rotor is equipped with an energizable coil for generating a magnetic field.

In this context, embodiments of the charged internal combustion engine may comprise where the permanent magnet preferably completely surrounds the cellular wheel serving as the rotor together with coil.

The static stator may alternatively be equipped with an energizable coil. External excitation is then achieved via an exciter coil, as in the case of an alternating-current motor. If electrical current is conducted through the coil, a magnetic field is generated.

If the comprex charger and the electrical machine are configured as a structural unit, i.e. an integrated component, embodiments of the charged internal combustion engine may further comprise where the housing serving as the stator is equipped with an energizable coil for generating a magnetic field.

In this context, embodiments of the charged internal combustion engine may comprise where the energizable coil preferably completely surrounds the cellular wheel serving as the rotor.

If the housing serving as the stator has an energizable coil, embodiments of the charged internal combustion engine may comprise where the cellular wheel serving as the rotor is also equipped with an energizable coil for generating a magnetic field.

The rotor is arranged and mounted inside the stator so as to be rotatable in the magnetic field of the stator. If the rotor also comprises a coil and this coil is energized, a magnetic field is generated in the rotor which interacts with the magnetic field of the stator such that the rotor rotates. In this way, electrical energy can be converted into kinetic energy, or into a movement of the rotor and thus of the charger shaft. The magnetic field in the rotor is static relative to the stator.

If the housing serving as the stator has an energizable coil, embodiments of the charged internal combustion engine may comprise where the cellular wheel serving as the rotor is equipped with a permanent magnet for generating a magnetic field. It is desired for the stator, in one example, to comprise an energizable coil for generating a magnetic field.

By contrast to the embodiment described above with regard to an energizable rotor coil, which demands a cyclic supply of electrical current to the rotating coil of the rotor, the present variant is one which does not demand an electrical current reversal, and thus no brushes. This type of electric motor is less complex, has a smaller space requirement, and is therefore suitable for applications with little structural space, such as the present application. A further advantage of the permanent magnet is the greater cogging torque when the electric motor is deactivated, i.e. when the stator coil, that is to say exciter coil, is not energized.

Embodiments of the charged internal combustion engine may further comprise where the comprex charger is a mechanically driven charger. Then, the comprex charger according to the disclosure with liquid cooling system can be implemented in existing charging concepts in which the comprex charger is mechanically driven, even in the context of retrofitting.

Embodiments of the charged internal combustion engine may comprise where the liquid cooling system is integrated in the housing of the comprex charger. Integration in the comprex charger further simplifies packaging in the engine bay. The installation space used is smaller, and the number of components is reduced.

Embodiments of the charged internal combustion engine may comprise where the liquid cooling system functions and is configured as a charge air cooler.

The charge air cooler cools the compressed charge air before entering the cylinders and ensures a better filling of the cylinders. With a corresponding design of charge air cooler, the charge air may be cooled in the charger during compression, giving thermodynamic advantages. In charged internal combustion engines in which the comprex charger serves for exhaust gas recirculation, via which exhaust gas from the exhaust gas discharge system can be recirculated into the intake system via the comprex charger, embodiments may comprise where the liquid cooling system functions and is configured as an EGR cooler with which the recirculated exhaust gas can be cooled. Cooling the recirculated exhaust gas achieves higher EGR rates and improves the cylinder filling.

In this context, embodiments of the charged internal combustion engine may comprise where the liquid cooling system is arranged on the intake side.

The charge air inlet and charge air outlet are arranged on the same end face of the cellular wheel or housing of the comprex charger. To this extent, it may be desired to arrange the liquid cooling system on the intake side. This applies both to a liquid cooling system which functions and is configured as a charge air cooler, and to a liquid cooling system which functions and is configured as a EGR cooler. Advantages are achieved if the charge air supplied to the cylinders and the recirculated exhaust gas are cooled before entering the cylinders, whereas the exhaust gas leaving the comprex charger again via the exhaust gas outlet is preferably not cooled, since this exhaust gas is regularly subject to exhaust gas aftertreatment downstream of the comprex charger.

If the comprex charger is a charger driven electrically via an electrical machine, and if the comprex charger and electrical machine are configured as a structural unit, i.e. an integrated component, embodiments of the charged internal combustion engine may comprise where the liquid cooling system functions and is configured as a cooling system of the electrical machine.

An electrical machine in operation generates heat which may be dissipated in order to limit degradation and maintain or guarantee the function capacity of the electrical machine. Also, the electrical machine is loaded with heat from the hot exhaust gas.

Embodiments of the charged internal combustion engine are advantageous in which at least one exhaust gas aftertreatment system is arranged in the exhaust gas discharge system downstream of the comprex charger. This design is preferred in order to the make optimum use of, i.e. to utilize as effectively as possible, the effect which is applied in the context of comprex charging for compressing charge air, namely the pressure waves propagating in the exhaust gas discharge system. Then no equipment which reduces or disrupts the propagation of the pressure waves and prevents satisfactory charging is arranged in the exhaust gas discharge system upstream of the comprex charger.

In some cases, embodiments of the charged internal combustion engine may be advantageous in which at least one exhaust gas aftertreatment system is arranged in the exhaust gas discharge system upstream of the comprex charger.

In the present case, the exhaust gas is after-treated or cleaned before entering the comprex charger serving for compression, as in the case of a low-pressure EGR.

In one example, a method for operating an internal combustion engine of the type described above, is achieved by a method which is characterized in that the comprex charger is used to recirculate exhaust gas, wherein the exhaust gas is taken from the exhaust gas discharge system and conveyed into the intake system via the comprex charger.

That which has already been stated with regard to the internal combustion engine according to the disclosure also applies to the method according to the disclosure. Different internal combustion engines desire, in part, correspondingly different method variants, in which regard reference is made to the corresponding statements.

Embodiments of the method comprise where the electrical machine is energized in order to set the cellular wheel of the comprex charger in rotation, wherein the rotational speed of the cellular wheel is established and controlled such that a pre-definable quantity of exhaust gas is recirculated.

In this context, embodiments of the method may comprise where when the rotational speed is established and controlled, at least one of the following parameters is taken into account including a temperature of the exhaust gas in the exhaust gas discharge system upstream of the comprex charger, a pressure of the exhaust gas in the exhaust gas discharge system upstream of the comprex charger, a temperature of the charge air in the intake system upstream of the comprex charger, a pressure of the charge air in the intake system upstream of the comprex charger, a temperature of the charge air in the intake system downstream of the comprex charger, and/or a pressure of the charge air in the intake system downstream of the comprex charger.

In this context, embodiments of the charged internal combustion engine may comprise where the liquid cooling system integrated in the housing completely encases the cellular wheel serving as the rotor.

With targeted configuration of charging, it is possible to obtain advantages not only with regard to the fuel consumption, i.e. the efficiency of the internal combustion engine, but also with regard to exhaust gas emissions. With suitable charging, for example of a diesel engine, the nitrogen oxide emissions can therefore be reduced without any losses in efficiency. At the same time, the hydrocarbon emissions can be positively influenced. The emissions of carbon dioxide, which correlate directly with fuel consumption, decrease in any case with falling fuel consumption.

To comply with future limit values for pollutant emissions, however, further measures are necessary. Here, the focus of the development work is on, inter alia, the reduction of nitrogen oxide emissions, which are of high relevance in particular in diesel engines. Since the formation of nitrogen oxides is caused by not only an excess of air but rather also high temperatures, one concept for lowering the nitrogen oxide emissions consists in developing combustion processes with lower combustion temperatures.

Here, exhaust gas recirculation (EGR), that is to say the recirculation of combustion gases from the outlet side to the inlet side, is expedient in achieving this aim, wherein it is possible for the nitrogen oxide emissions to be considerably reduced with increasing exhaust gas recirculation rate. Here, the exhaust gas recirculation rate xEGR is determined as $xEGR=mEGR/(mER+m_{air})$, where mEGR denotes the mass of recirculated exhaust gas and main denotes the supplied air. The oxygen provided via exhaust gas recirculation may need to be taken into consideration.

To obtain a considerable reduction in nitrogen oxide emissions, high exhaust gas recirculation rates are desired which may be of the order of magnitude of xEGR 60% to 70%.

During the operation of an internal combustion engine with exhaust gas turbocharging and the simultaneous use of an exhaust gas recirculation arrangement, a conflict may arise if the recirculated exhaust gas is extracted from the exhaust gas discharge system upstream of the turbine by means of high-pressure EGR and is no longer available for driving the turbine.

In the event of an increase in the exhaust gas recirculation rate, the exhaust gas flow introduced into the turbine simultaneously decreases. The reduced exhaust gas mass flow through the turbine leads to a lower turbine pressure ratio, as a result of which the charge pressure ratio also falls, which equates to a smaller compressor mass flow. Aside from the decreasing charge pressure, problems may additionally arise in the operation of the compressor with regard to the surge limit. Disadvantages may also arise in terms of the pollutant emissions, for example with regard to the formation of soot during an acceleration in the case of diesel engines.

For this reason, configurations are also used which can ensure sufficiently high charge pressures, in particular in the part load region, with high exhaust gas recirculation rates, such as for example the low-pressure EGR system.

By contrast to the abovementioned high-pressure EGR arrangement, in which exhaust gas is extracted from the exhaust gas discharge system upstream of the turbine and—preferably—introduced into the intake system downstream of the compressor, in the case of a low-pressure EGR arrangement exhaust gas which has already flowed through the turbine is recirculated to the inlet side. For this purpose, the low-pressure EGR arrangement comprises a recirculation line which branches off from the exhaust gas discharge system downstream of the turbine and which opens into the intake system upstream of the compressor.

The exhaust gas which is recirculated to the inlet side via the low-pressure EGR arrangement is mixed with fresh air upstream of the compressor. The mixture of fresh air and recirculated exhaust gas produced in this way forms the charge air which is supplied to the compressor and compressed, wherein the compressed charge air is cooled, preferably downstream of the compressor, in a charge air cooler.

Here, the fact that exhaust gas is conducted through the compressor during the course of the low-pressure EGR is not detrimental, because exhaust gas is generally used which has been subjected to exhaust gas aftertreatment, for example in a particle filter, downstream of the turbine.

There is therefore no risk of deposits in the compressor which change the geometry of the compressor, in particular the flow cross-sections, and thereby impair the efficiency of the compressor.

Problems may arise however because of cooling of the compressed charge air or recirculated exhaust gas. During the course of cooling, any liquids, in particular water, still contained in gaseous form in the charge air or exhaust gas may condense out. Condensate may enter the cylinder or compressor in pulses and disrupt the operation of the internal combustion engine or damage the compressor.

Difficulties also arise in providing the pressure gradient between the exhaust gas discharge system and the intake system which is necessary for realizing high recirculation rates, in particular in the case of a low-pressure EGR. Therefore, additional measures are usually desired. According to the prior art, a shut-off element is therefore provided in the exhaust gas discharge system in order to cause a build-up of the exhaust gas and increase the exhaust gas pressure, and/or a shut-off element is provided in the intake system in order to lower the pressure at the inlet side. Both measures are rather disadvantageous from an energy aspect. In particular, the throttling of the charge air at the inlet side may be regarded as being disadvantageous with regard to the charging of the internal combustion engine.

The charged internal combustion engine to which the present disclosure relates also has at least one exhaust gas recirculation system. According to the prior art, such internal combustion engines still have significant potential for improvement. In particular, the transient operating behavior demands improvement.

In addition, shut-off elements of an exhaust gas recirculation system, for example an EGR valve arranged in the recirculation line to set the recirculation rate, or a shut-off element arranged in the exhaust gas discharge system to increase the exhaust gas back pressure, are under high thermal load and susceptible to deposits owing to permanent bombardment with hot exhaust gas. The latter increases the susceptibility to fault and may also lead to function losses of the shut-off element.

Internal combustion engines with a comprex charger which recirculate exhaust gas via the comprex charger suffer from the fact that the recirculated exhaust gas quantity cannot be set or controlled correctly, or not sufficiently correctly, via a mechanically driven comprex charger.

In one example, improvements with regard to charging and exhaust gas recirculation via a pressure wave charger, and with which the disadvantages from the prior art can be overcome are described with respect to embodiments of the present disclosure.

In one example, a charged internal combustion engine comprises at least one cylinder, an exhaust gas discharge system for the discharge of the exhaust gases, an intake system for the supply of charge air, and at least one comprex charger comprising a cylindrical cellular wheel which is rotatable about a rotation axis, is arranged in a housing and comprises cells which extend between the end faces of the cellular wheel along the rotation axis of the cellular wheel, which is characterized in that the comprex charger is a charger driven electrically by means of an electrical machine, wherein the electrical machine comprises a stator and a rotor.

The electrical drive is independent of crankshaft rotational speed, so the comprex charger can be driven by means of the electrical machine in accordance with need at all times. This is independent of the momentary operating state of the internal combustion engine, in particular the engine rotational speed.

The recirculation of exhaust gas via the comprex charger is significantly improved since the quantity of recirculated exhaust gas can be set or controlled precisely via the freely controllable rotational speed of the cellular wheel, so that a pre-definable exhaust gas quantity can be recirculated.

In one example, an internal combustion engine is provided which is improved with respect to charging and exhaust gas recirculation via a pressure wave charger, and with which the disadvantages known from the prior art can be overcome.

Embodiments of the charged internal combustion engine may comprise where the cells are formed open at the end faces of the cellular wheel.

Embodiments of the charged internal combustion engine are advantageous in which in the housing, an exhaust gas inlet and spaced therefrom an exhaust gas outlet are provided on one end face, and a charge air inlet and spaced therefrom a charge air outlet are provided on the other end face, so that at the end faces of the cellular wheel, the cells are open in limited predefined regions of the housing and are otherwise closed.

Embodiments of the charged internal combustion engine may be advantageous in which the comprex charger and the electrical machine constitute or are separate components.

In this context, embodiments of the charged internal combustion engine may be advantageous in which the comprex charger and the electrical machine are connected together by means of a traction means drive.

FIG. 1 shows diagrammatically and in a three-dimensional depiction a comprex charger 2 integrated in the intake system 5, 6 and exhaust gas discharge system 4, 7, together with mechanical drive 3 according to the prior art.

The exhaust gases reach the cellular wheel 2 filled with air, and via an exhaust gas inlet leave the high-pressure part 4 of the exhaust gas discharge system to enter the cells which are open on the exhaust gas side. A pressure wave runs through the cells filled with air, thus compressing the air, wherein reflections on the walls of the cells closed on the air side achieves a further pressure rise. As a result of the rotational movement of the cellular wheel 2, then on the air side a connection is created between the cells and the high-pressure part 5 of the intake system, and the compressed air leaves the cells and flows into the high-pressure part 5 of the intake system and from there into the cylinder 1. Before the exhaust gases have flowed completely through the cells, the cells close again on the air side under the rotational movement of the cellular wheel 2. A reduced pressure wave occurs which runs into the exhaust gas discharge system as soon as the cells have opened on the exhaust gas side under the rotational movement and are connected to the low-pressure part 7 of the exhaust gas discharge system. This flushes the exhaust gases out of the cellular wheel 2. When the reduced pressure wave reaches the end of the cells, charge air is drawn in again, i.e. aspirated into the cells open on the air side, from the low-pressure part 6 of the intake system via the charge air inlet.

In contrast to other charging concepts, a comprex charger is distinguished above all by a desired torque development and response behavior, which significantly improves the transient operating behavior of the internal combustion engine. According to the prior art, a comprex charger 2 is driven mechanically, so a device 3 is provided to transmit power between the internal combustion engine and the comprex charger 2, influencing the packaging in the engine bay. The drive is not therefore independent of the rotational speed of the crankshaft.

The disadvantage is that the comprex charger only works or can be operated optimally at the rated point, and reacts very sensitively to changes or disruptions in the intake system or exhaust gas discharge system, for example a clogged air filter. The charge pressure ratio is limited to around 2.

The internal combustion engine to which the present disclosure relates has a comprex charger for charging purposes, wherein at least one further compressor may be provided, specifically either a charger that can be driven by means of an auxiliary drive or a compressor of an exhaust gas turbocharger.

Turning now to FIG. 2, it shows, diagrammatically and in longitudinal section along a rotation axis 10c, the comprex charger 10 of a first embodiment of the charged internal combustion engine.

The comprex charger 10 comprises a cylindrical cellular wheel 10a which is rotatable about the rotation axis 10c, is arranged in a housing 10b and comprises cells of segment-like cross-section which extend between the end faces of the cellular wheel 10a along the rotation axis 10c of the cellular wheel 10a.

The comprex charger 10 is driven by means of an electrical machine 11. The electrical machine 11 comprises a stator 11a and a rotor 11b, wherein the cellular wheel 10a of the charger 10 forms the rotor 11b, and the housing 10b of the charger forms the stator 11a. The comprex charger 10 and the electrical machine 11 are thus configured as an integrated component.

The exhaust gases reach the cellular wheel 10a filled with air, and via the housing opening leave the high-pressure part 14 of the exhaust gas discharge system to enter the cells. A pressure wave runs through the cells filled with air, thus compressing the air, wherein reflections on the walls of the cells closed on the air side achieves a further pressure rise.

The rotational movement of the cellular wheel 10a then creates a connection between the cells and the high-pressure part 15 of the intake system, so that the compressed air expands, leaves the cells and flows into the high-pressure part 15 of the intake system.

Before the exhaust gases have flowed completely through the cells, the cells close again on the air side under the rotational movement of the cellular wheel 10a. A reduced pressure wave occurs which runs into the exhaust gas discharge system as soon as the cells have opened on the exhaust gas side under the rotational movement and are connected to the low-pressure part 17 of the exhaust gas discharge system. This flushes the exhaust gases out of the cellular wheel 10a. When the reduced pressure wave reaches the end of the cells, charge air is again drawn into the cells open on the air side from the low-pressure part 16 of the intake system via the charge air inlet.

The comprex charger 10 is equipped with a liquid cooling system 18. By integrating the liquid cooling system 18 into the comprex charger 10, in the present case into the housing 10b, the need to position a separate liquid cooling system in the engine bay is eliminated.

Figure 3A:
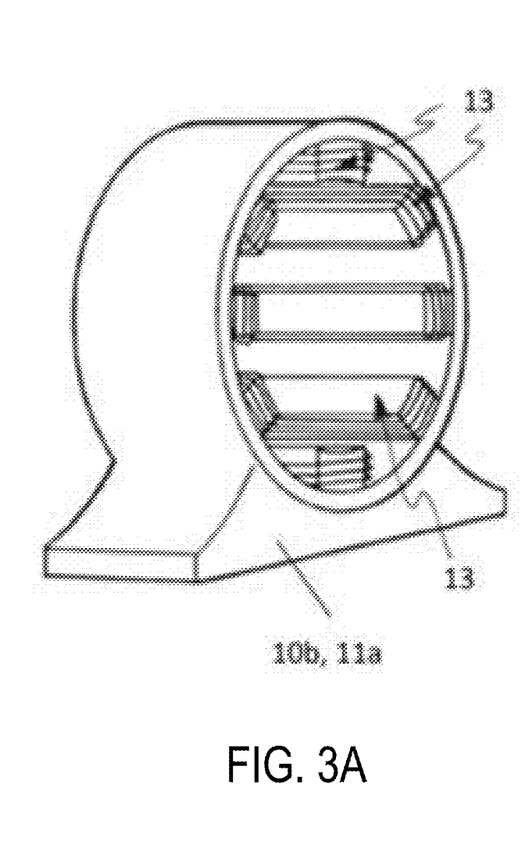
FIGS. 3A and 3B show diagrammatically, and in a three-dimensional exploded depiction, the cellular wheel and housing of the comprex charger.
Figure 3B:
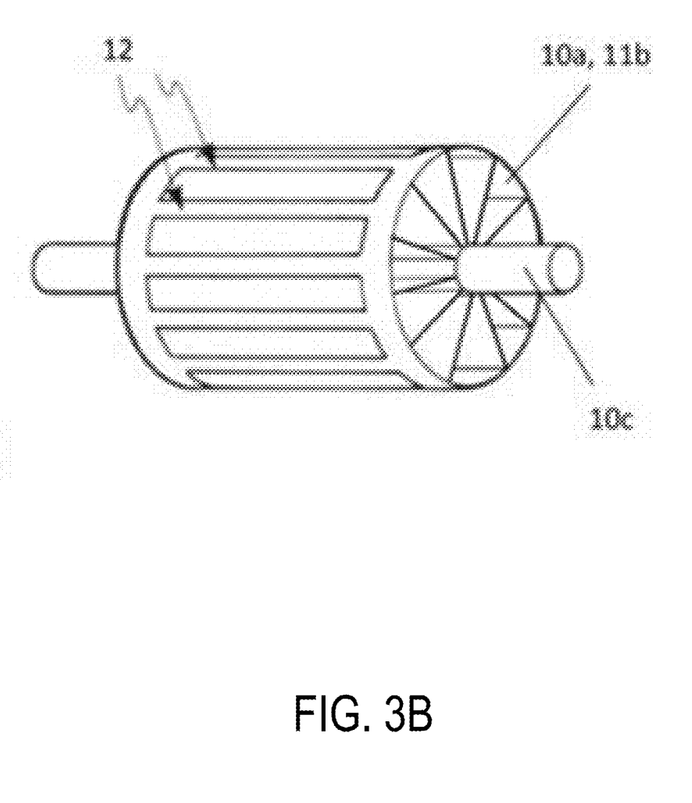

FIGS. 3A and 3B show diagrammatically and in a three-dimensional exploded depiction the housing 10b and the cellular wheel 10a of the comprex charger 10 shown diagrammatically in FIG. 2, respectively. The following statements are merely supplementary to those given with regard to FIG. 2.

The housing 10b serving as the stator 11a is equipped with an energizable coil 13 for generating a magnetic field, wherein the coil 13 is composed of several segment-like part coils. These part coils completely surround or encase the cellular wheel 10a serving as the rotor 11b in the mounted state of the charger 10.

The housing 10a serving as the rotor 11b is equipped with a permanent magnet 12 for generating a magnetic field, wherein the permanent magnet 12 is composed of several strip-like part magnets. These part magnets are oriented along the rotation axis 10c, The embodiments of the comprex charger 10 shown use little installation space. A cyclic power supply to the rotating coil of the rotor 11b, with associated brushes, is not needed.

FIG. 4 shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger (not shown).

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels 159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154.

Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

In one example, the electric machine 151 is integrally formed with a comprex charger, such as comprex charger 10b of FIGS. 2 and 3B. As illustrated, a first extreme end of the electric machine 151 is fluidly coupled to the intake system and a second extreme end, opposite the first extreme end, is fluidly coupled to the exhaust system.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 5, it shows a method 500 for adjusting a comprex charger speed in response to a desired EGR flow rate. Instructions for carrying out method 500 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 500 begins at 502, which includes determining current engine operating parameters. Determining current engine operating parameters may include but is not limited to one or more of a manifold pressure, a throttle position, a mass air flow rate, an engine speed, an engine temperature, a vehicle speed, and an air/fuel ratio.

The method 500 proceeds to 504, which includes determining a comprex motor speed. The comprex motor speed may be based on a voltage provided to an electric machine. Additionally or alternatively, a rotational speed of the cellular wheel, which is equal to the comprex motor speed, may be directly measured. As described above, the rotational speed of the comprex charger (e.g., the cellular wheel) may be based on one or more of an exhaust gas temperature and/or pressure and a charge air temperature and/or pressure. In one example, the exhaust gas temperature is a temperature of exhaust gas in the exhaust gas discharge system upstream of the comprex charger. In one example, the exhaust gas pressure is an exhaust gas pressure of exhaust gas in the exhaust gas discharge system upstream of the comprex charger. In one example, the temperature of the charge air is a charge air temperature sensed in the intake system upstream of the comprex charger. In one example, the pressure of the charge air is a charge air pressure sensed in the intake system upstream of the comprex charger. In one example, the temperature of the charge air is a charge air temperature sensed in the intake system downstream of the comprex charger. In one example, the pressure of the charge air is a charge air pressure sensed in the intake system downstream of the comprex charger.

In this example, upstream of the comprex charger refers to a gas flowing toward the comprex charger and downstream of the comprex charger refers to a gas flowing away from the comprex charger.

The method 500 proceeds to 506, which includes determining a desired EGR flow rate. The desired EGR flow rate may be based on a mass flow. Additionally or alternatively, the desired EGR flow rate is further based on the engine load, engine temperature, and engine $NO_x$ output.

The method 500 proceeds to 508, which includes determining if a current EGR flow rate is equal to a desired EGR flow rate. The current EGR flow rate may be determined via an EGR flow rate sensor, EGR valve position, or based on data stored in a multi-input look-up table mapping engine speed, engine fuel injection amount, mass air flow, and the like.

If the current engine speed is equal to the desired EGR flow rate, then the method 500 proceeds to 510, which includes maintaining current operating parameters. As such, a cellular wheel speed is not adjusted to maintain the current EGR flow rate.

Returning to 508, if the current EGR flow rate is not equal to the desired EGR flow rate, then the method 500 proceeds to 512, which includes determining if the current EGR flow rate is less than the desired EGR flow rate. If the current EGR flow rate is less than the desired EGR flow rate, then the method 500 proceeds to 514, which includes increasing the comprex motor speed (e.g., the cellular wheel speed) to meet the desired EGR demand. By increasing the cellular wheel speed, more exhaust gas may be drawn into the comprex charger, resulting in an increased EGR flow rate. By doing this, the current EGR flow rate may increase and become equal to the desired EGR flow rate.

The method 500 proceeds to 516, which includes mixing EGR with intake air.

Returning to 512, if the current EGR flow rate is not less than the desired EGR flow rate, then the method 500 proceeds to 518, which includes determining that the current EGR flow rate is greater than the desired EGR flow rate. The method 500 proceeds to 520, which includes reducing the comprex motor speed (e.g., the cellular wheel speed) to meet the desired EGR demand. By reducing the cellular wheel speed, less exhaust gas may be drawn into the comprex charger, resulting in a reduced EGR flow rate. By doing this, the current EGR flow rate may be reduced and become equal to the desired EGR flow rate. The method 500 proceeds to 516 as described above.

In one aspect, a comprex charger may comprise a cooling system fluidly coupled to an electric motor. The cooling system of comprex charger may function as a charge-air cooler and an EGR cooler. Furthermore, a rotational speed of the comprex charger may be adjusted to adjust an EGR flow rate to a desired EGR flow rate during a variety of operating conditions. The technical effect of the comprex charger is to provide compressed air during an increased number of operating conditions relative to turbocharger arrangements along with decreasing packaging constraints by integrating the cooling system with the electric motor.

An example of a charged internal combustion engine, comprises at least one cylinder, an exhaust gas discharge system configured to discharge exhaust gases, an intake system configured to supply charge air to the at least one cylinder, at least one comprex charger comprising a cylindrical cellular wheel which is rotatable about a rotation axis, is arranged in a housing, and comprises a plurality of cells which extend between end faces of the cellular wheel along the rotation axis of the cellular wheel, and wherein the comprex charger comprises a liquid cooling system, and a controller with computer-readable instructions stored on non-transitory memory thereof that when executed enable the controller to adjust a rotational speed of the cylindrical cellular wheel in response to one or more of a temperature or a pressure of exhaust gas in the exhaust gas discharge system upstream of the comprex charger and a temperature or pressure of charge air in the intake system upstream or downstream of the comprex charger.

A first example of the charged internal combustion engine further comprises where the plurality of cells is open at end faces of the cellular wheel.

A second example of the charged internal combustion engine, optionally including the first example, further includes where the housing comprises an exhaust gas inlet and spaced therefrom an exhaust gas outlet on a first end face, the housing further comprising a charge air inlet and spaced therefrom a charge air outlet on a second end face, wherein the plurality of cells is open only at the end faces and closed at other regions of the housing.

A third example of the charged internal combustion engine, optionally including one or more of the previous examples, further includes where the comprex charger is driven electrically via an electrical machine, wherein the electrical machine comprises a stator and a rotor.

A fourth example of the charged internal combustion engine, optionally including one or more of the previous examples, further includes where the comprex charger and the electrical machine are separate components.

A fifth example of the charged internal combustion engine, optionally including one or more of the previous examples, further includes where the comprex charger and the electrical machine are coupled via a traction means drive.

A sixth example of the charged internal combustion engine, optionally including one or more of the previous examples, further includes where the comprex charger and the electrical machine are configured as an integrated component, wherein the cellular wheel is configured as the rotor, and the housing is configured as the stator.

A seventh example of the charged internal combustion engine, optionally including one or more of the previous examples, further includes where the housing configured as the stator comprises a permanent magnet for generating a magnetic field.

An eighth example of the charged internal combustion engine, optionally including one or more of the previous examples, further includes where the cellular wheel configured as the rotor comprises an energizable coil for generating a magnetic field.

A ninth example of the charged internal combustion engine, optionally including one or more of the previous examples, further includes where the permanent magnet surrounds the cellular wheel with the coil.

A tenth example of the charged internal combustion engine, optionally including one or more of the previous examples, further includes where the housing configured as the stator comprises an energizable coil for generating a magnetic field.

An eleventh example of the charged internal combustion engine, optionally including one or more of the previous examples, further includes where the energizable coil surrounds the cellular wheel.

An example of a system, comprises an engine comprising an exhaust gas discharge system and an intake system, a comprex charger comprising a cylindrical cellular wheel rotatable about an axis of rotation within a housing, wherein the cylindrical cellular wheel comprises a plurality of cells extending from opposite extreme ends of the cylindrical cellular wheel, wherein the comprex charger is electrically driven via an electric machine, the comprex charger and the electric machine are configured as an integrated component, and a controller with computer-readable instructions stored on non-transitory memory thereof that when executed enable the controller to adjust a rotational speed of the cylindrical cellular wheel in response to one or more of a temperature or a pressure of exhaust gas in the exhaust gas discharge system upstream of the comprex charger and a temperature or pressure of charge air in the intake system upstream or downstream of the comprex charger.

A first example of the system further includes where the housing is configured as a stator of the electric machine and the cellular wheel is configured as a rotor of the electric machine.

A second example of the system, optionally including the first example, further includes where the opposite extreme ends include a first extreme end and a second extreme end, wherein the first extreme end is fluidly coupled to the intake system and the second extreme end is fluidly coupled to the exhaust gas discharge system.

A third example of the system, optionally including one or more of the previous examples, further includes where the comprex charger comprises a cooling system arranged at the first extreme end.

A fourth example of the system, optionally including one or more of the previous examples, further includes where the cooling system is configured to thermally regulate each of the comprex charger and the electric machine.

A fifth example of the system, optionally including one or more of the previous examples, further includes where exhaust gas recirculate is recirculated into the intake system via the comprex charger.

An example of a method comprises setting a rotational speed of a comprex charger arranged in a housing with an electric machine, wherein the comprex charger comprises a cellular wheel configured as a rotor of the electric machine, wherein the setting is based on one or more of a temperature or a pressure of exhaust gas in the exhaust gas discharge system upstream of the comprex charger and a temperature or pressure of charge air in the intake system upstream or downstream of the comprex charger and adjusting the rotational speed of the comprex charger in response to a comparison between an actual EGR flow rate and a desired EGR flow rate.

A first example of the method further includes where increasing the rotational speed of the comprex charge in response to the actual EGR flow rate being less than the desired EGR flow rate and reducing the rotational speed of the comprex charger in response to the actual EGR flow rate being greater than the desired EGR flow rate.

An example of a system, comprises an engine comprising an exhaust gas discharge system and an intake system and a comprex charger comprising a cylindrical cellular wheel rotatable about an axis of rotation within a housing, wherein the cylindrical cellular wheel comprises a plurality of cells extending from a first extreme end to a second extreme end, opposite the first extreme end of the cylindrical cellular wheel, wherein the comprex charger is electrically driven via an electric machine, the comprex charger and the electric machine are configured as an integrated component, wherein the housing is configured as a stator of the electric machine and the cellular wheel is configured as a rotor of the electric machine, further comprising a cooling arrangement completely encasing the cellular wheel.

A first example of the system further includes where the intake system is fluidly coupled to the first extreme end and the exhaust gas discharge system is fluidly coupled to the second extreme end, wherein exhaust gas recirculate flows through the plurality of cells before entering the intake system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A charged internal combustion engine, comprising:
   at least one cylinder;
   an exhaust gas discharge system configured to discharge exhaust gases;
   an intake system configured to supply charge air to the at least one cylinder;
   at least one comprex charger comprising a cylindrical cellular wheel which is rotatable about a rotation axis, is arranged in a housing, and comprises a plurality of cells which extend between end faces of the cellular wheel along the rotation axis of the cellular wheel, and wherein the comprex charger comprises a liquid cooling system; and
      a controller with computer-readable instructions stored on non-transitory memory thereof that when executed enable the controller to adjust a rotational speed of the cylindrical cellular wheel in response to one or more of a temperature or a pressure of exhaust gas in the exhaust gas discharge system upstream of the comprex charger and a temperature or pressure of charge air in the intake system upstream or downstream of the comprex charger.

2. The charged internal combustion engine of claim 1, wherein the plurality of cells is open at end faces of the cellular wheel.

3. The charged internal combustion engine of claim 1, wherein the housing comprises an exhaust gas inlet and spaced therefrom an exhaust gas outlet on a first end face, the housing further comprising a charge air inlet and spaced therefrom a charge air outlet on a second end face, wherein the plurality of cells is open only at the end faces and closed at other regions of the housing.

4. The charged internal combustion engine of claim 1, wherein the comprex charger driven electrically via an electrical machine, wherein the electrical machine comprises a stator and a rotor.

5. The charged internal combustion engine of claim 4, wherein the comprex charger and the electrical machine are separate components.

6. The charged internal combustion engine of claim 5, wherein the comprex charger and the electrical machine are coupled via a traction means drive.

7. The charged internal combustion engine of claim 4, wherein the comprex charger and the electrical machine are configured as an integrated component, wherein the cellular wheel is configured as the rotor, and the housing is configured as the stator.

8. The charged internal combustion engine of claim 7, wherein the housing configured as the stator comprises a permanent magnet for generating a magnetic field.

9. The charged internal combustion engine of claim 8, wherein the cellular wheel configured as the rotor comprises an energizable coil for generating a magnetic field.

10. The charged internal combustion engine of claim 9, wherein the permanent magnet surrounds the cellular wheel with the coil.

11. The charged internal combustion engine of claim 7, wherein the housing configured as the stator comprises an energizable coil for generating a magnetic field.

12. The charged internal combustion engine of claim 11, wherein the energizable coil surrounds the cellular wheel.

13. A system, comprising:
   an engine comprising an exhaust gas discharge system and an intake system;
   a comprex charger comprising a cylindrical cellular wheel rotatable about an axis of rotation within a housing, wherein the cylindrical cellular wheel comprises a plurality of cells extending from opposite extreme ends of the cylindrical cellular wheel; wherein
   the comprex charger is electrically driven via an electric machine, the comprex charger and the electric machine are configured as an integrated component; and
   a controller with computer-readable instructions stored on non-transitory memory thereof that when executed enable the controller to adjust a rotational speed of the cylindrical cellular wheel in response to one or more of a temperature or a pressure of exhaust gas in the exhaust gas discharge system upstream of the comprex charger and a temperature or pressure of charge air in the intake system upstream or downstream of the comprex charger.

14. The system of claim 13, wherein the housing is configured as a stator of the electric machine and the cellular wheel is configured as a rotor of the electric machine.

15. The system of claim 13, wherein the opposite extreme ends include a first extreme end and a second extreme end, wherein the first extreme end is fluidly coupled to the intake system and the second extreme end is fluidly coupled to the exhaust gas discharge system.

16. The system of claim 15, wherein the comprex charger comprises a cooling system arranged at the first extreme end.

17. The system of claim 16, wherein the cooling system is configured to thermally regulate each of the comprex charger and the electric machine.

18. The system of claim 13, wherein exhaust gas recirculate is recirculated into the intake system via the comprex charger.

19. A method, comprising:
setting a rotational speed of a comprex charger arranged in a housing with an electric machine, wherein the comprex charger comprises a cellular wheel configured as a rotor of the electric machine, wherein the setting is based on one or more of a temperature or a pressure of exhaust gas in the exhaust gas discharge system upstream of the comprex charger and a temperature or pressure of charge air in the intake system upstream or downstream of the comprex charger; and
adjusting the rotational speed of the comprex charger in response to a comparison between an actual EGR flow rate and a desired EGR flow rate.

20. The method of claim 19, further comprising increasing the rotational speed of the comprex charge in response to the actual EGR flow rate being less than the desired EGR flow rate and reducing the rotational speed of the comprex charger in response to the actual EGR flow rate being greater than the desired EGR flow rate.

* * * * *